US005492382A

United States Patent [19]

McBride et al.

[11] Patent Number: 5,492,382

[45] Date of Patent: Feb. 20, 1996

[54] ELECTRO-MECHANICAL LOCKS FOR SECURITY ACCESSES

[75] Inventors: William B. McBride; John C. Tomlinson; William R. Wilson, all of Tallahassee, Fla.

[73] Assignee: Security & Control Equipment, Inc., Tallahassee, Fla.

[21] Appl. No.: 250,701

[22] Filed: May 27, 1994

[51] Int. Cl.[6] .......... C05B 15/02

[52] U.S. Cl. .......... 292/341.17; 292/201

[58] Field of Search .......... 292/341.16, 341.17, 292/201

[56] References Cited

U.S. PATENT DOCUMENTS

| | | | |
|---|---|---|---|
| 430,764 | 6/1890 | Beers et al. | 70/279 |
| 473,061 | 4/1892 | Crockett et al. | 70/279 |
| 1,768,021 | 4/1926 | Bauerband . | |
| 3,142,166 | 7/1964 | Adam et al. | 70/282 |
| 3,157,042 | 11/1964 | Wolz | 70/279 |
| 3,792,888 | 2/1974 | Kambic | 292/144 |
| 3,953,991 | 5/1976 | Grossman | 70/282 X |
| 4,123,096 | 10/1978 | Ardizio | 292/341.17 X |
| 4,570,466 | 2/1986 | Matthews | 70/279 X |
| 4,685,709 | 8/1987 | Kambic | 70/279 X |
| 4,824,151 | 4/1989 | Taylor | 292/341.16 X |
| 4,978,153 | 12/1990 | Hirsch et al. | 292/201 |
| 4,993,757 | 2/1991 | Corzine | 292/144 |
| 5,195,792 | 3/1993 | Stendal | 292/341.16 |
| 5,216,909 | 6/1993 | Armoogam | 292/144 X |
| 5,217,266 | 6/1993 | Köstlek | 292/341.16 X |

*Primary Examiner*—Peter M. Cuomo
*Assistant Examiner*—Monica E. Millner
*Attorney, Agent, or Firm*—Dowell & Dowell

[57] ABSTRACT

An electro-mechanical lock which includes a housing having right and left side cavities in which a latch block may be selectively mounted to cooperatively retain a tongue extending from a door or gate which slides or swings from either the left or right side. The latch block includes a pivotable "J" latch which is engageable within a slot in the tongue extending from a gate or door to be locked as the tongue engages the "J" latch as the gate or door is closed. A latch retainer is operable to secure the latch in an engaged position with the tongue and is retractable by a solenoid or mechanical element controlled by a key operated cylinder to release the "J" latch and allow opening of the gate or door.

18 Claims, 5 Drawing Sheets

ELECTRO-MECHANICAL LOCKS FOR SECURITY ACCESSES

BACKGROUND OF THE INVENTION

1. Field of the Invention

This invention is generally directed to electro-mechanical locks of the type which are designed to be utilized on doors and gates associated with security areas including fences surrounding prison confinement areas, restricted access security zones and other enclosures wherein controlled access is required. Such locks are remotely controllable from a plurality of check point or guard areas and are sufficiently durable to withstand adverse environmental conditions and remain fully operable. The locks of the present invention include interchangeable latching assemblies which are in a "block" configuration so as to be utilizable with either sliding or swinging gates including gates mounted to slide or swing from the left or the right side of an opening thereby allowing a universal application of the latching mechanism of the locks regardless of the existing configuration of the door or gate to which the locks are to be installed.

2. Description of the Related Art

There have been many locks designed for use on chain link and steel fences and walls which extend around high security enclosures such as prisons. In a typical prison installation, the security locks are installed in what is referred to as a "Sally" port. A "Sally" port usually includes a combination of four or more gates located in two parallel fences. There are two gates for pedestrian access and two gates for vehicular access. If there are more gates they are usually for pedestrians to enter the area between the fences or a control room. The security locks are controlled remotely from a guard tower or a control room. In most installations the locks can be controlled from a plurality of locations.

In a typical high security area there will be many instances wherein the access locks are constantly exposed to environmental elements. In a prison installation the perimeter fences around the facility are cleared of all vegetation and overhead cover or screening. This exposes the locks directly to the elements and in many instances leads to premature failure of locking mechanisms either due to exposure to dirt and debris or to environmental conditions such as rain or ice.

In a high security area, when a person has been cleared to enter a facility, an outside gate is opened and the person is allowed to enter into a confinement area between enclosures or fences. After passing through the outer gate, the outer gate is closed and locked and an inner gate is opened allowing the person to pass through the inner gate into the enclosure. This same type of double entry access is provided for vehicular traffic. In the event of power failure, the locking mechanisms for the gates must be controllable manually. Further, in order to be secure, the locks of the outer and inner gates must be controlled so that when one of the locks is open, the remaining locks remain closed. In a typical "Sally" port installation, when one of the locks of the four gates is open none of the remaining gates can be opened. It is therefore necessary for the locks to contain sensors that indicate that a particular gate is closed and locked in a secured or latched position. When these conditions are met, other locks in the "Sally" port can be selectively opened.

Most security locks utilized in prison and other high security areas currently use a "shot" pin latching mechanism. The gate or door to be locked includes a tongue having an opening therein. When the gate or door is closed, a lock pin drops through the opening in the tongue thereby preventing the gate or door from being moved relative to the lock. When it is desired to open the gate, typically, a solenoid or mechanical lock linkage is utilized to engage and lift the "shot" pin from the opening in the tongue thereby releasing the door or gate for opening.

Experience with prior art locks has pointed to several problems. The most frequent problem is the need to hold the latching pin in a raised position while a gate or door is open. Some of the prior art locks use a complicated lever and latch to hold the latch pin up after it is initially lifted by a solenoid or mechanical linkage. It is, however, possible to trip the control circuit and drop the pin while the gate is open. If the latch pin is dropped when the gate is open, and the gate or door is closed, the tongue associated with the gate or door will engage the pin and, in many instances, cause damage to the pin. When the pin is damaged it can not be withdrawn and thereafter latched in a proper position within the opening of the tongue associated with the door or gate. If a lock is faulty, the area being controlled is no longer secured.

In prior art latching mechanisms that utilize a solenoid to retain a latch in an engaged position, there are other problems which have been experienced. For instance, a guard controlling such solenoid operated locks may have to continuously push switches that activate the solenoids and retain them in an "on" condition. In many instances, continually activating the solenoid to an "on" condition results in excessive use of the solenoid which can result in premature failure of the solenoid. In addition, the requirement to continuously activate a switch to control the latch by the solenoid may require that the attention of the guard, or other individual controlling the gate, be directed from making other observations which may be associated with their duties.

Another problem inherent in prior art security locking mechanisms is that they are not designed to be interchangeable. Therefore, specific locks must be manufactured for installation with respect to swinging doors and sliding doors and further consideration must be given to manufacturing locks to accept locking tongues which are installed on doors or gates which are either slidable or pivoted from their left or right side depending on installation requirements. As there has been no consideration given to providing a locking mechanism which offers universal installation with respect to left or right hand sliding or swinging doors or gates, installation and repair or replacement costs are excessive.

Another problem experienced with prior art electro-mechanical security locks is that when a power failure is experienced, because of the manner in which the solenoid mechanisms are installed to control the "shot" pin type latching members, a great deal of force is required to release the shot pins. This has required manual locking mechanisms which are controlled by rather large keys which are not compatible with other locks associated with interior passageways within a secured facility. Thus, separate keys must be carried by guards for the outer security gates.

Some examples of prior art electro-mechanical locks and security locks are disclosed in U.S. Pat. Nos. 430,764; 473,061; 1,768,021; 3,142,166; 3,157,042; 3,792,888; 3,953,991; 4,570,466; 4,685,709; 4,993,757 and 5,216,909.

SUMMARY OF THE INVENTION

This invention is directed to electro-mechanical security locks which may be utilized on security doors and gates of the type associated with prisons and high security areas which include a housing having a first cavity in which electro-mechanical control components are selectively enclosed and a pair of separate cavities in which a latch block assembly may be selectively mounted so that the lock may be utilized either for left or right hand sliding or swinging door or gate installations.

The latching assembly of the present invention includes a block in which a "J" latch is pivotally mounted. The "J" latch has a first component or locking tongue which is engageable in a rocking manner within an opening in a tongue extending from a sliding or swinging door or gate. The "J" latch is normally urged into an open position, in which it does not obstruct entry of the gate or door tongue into a slotted opening formed in the side, front and rear walls of the housing, by means of a spring mounted within the housing. The latch is urged against the spring by engagement of the gate tongue and is pivotable to a fully locked position wherein a latch retainer operates by gravity and resilient force to engage a second segment of the "J" latch and retain it in a locked position. Opening of the "J" latch is controlled electrically by a solenoid which is connected by a rod to the retainer. Upon operation of the solenoid, the rod lifts the retainer free of the "J" latch thereby allowing the tongue of the door or gate to be removed as the "J" latch rotates about its pivot pin.

The security lock of the present invention further includes a mechanical key operated cylinder lock having a pin for actuating the latch retainer. The cylinder is of the replaceable type.

The present invention further includes micro switches which are activated to indicate whether or not the locks are open or securely closed. One micro switch is designed to be engageable when the tongue associated with the gate or door is positioned within the slotted opening of the latch block assembly to thereby reflect that the latch has been urged to a closed position. A second micro switch is provided which is engageable by the movement of the latch retainer to indicate that the latch retainer is in a position to secure the latch in a closed position. When both micro switches indicate that the tongue is engaged by the latch and the latch is secured by the retainer, a positive indication of secured locking is indicated.

In the preferred embodiment, the latch is formed as a block assembly which is designed to be insertable within two separate cavities of the lock housing. The latch and latch retainer are mounted to the block which is in a generally square configuration having a slotted opening formed between walls defining the block. The latch and latch retainer are pivotally mounted between the walls of the block. The block may be installed either parallel to the front and rear of the lock housing or perpendicularly thereto depending upon whether a sliding door or swinging door is to be secured. When the latch block assembly is mounted perpendicularly to the front and rear of the lock housing, it may be tripped by the tongue of a door mounted to swing relative to the lock housing. When the latch block is mounted parallel to the front and rear of the lock housing, the latch is tripped by the tongue associated with the sliding door or gate which is movable generally perpendicularly with respect to the front and rear of the lock housing.

It is the primary object of the present invention to provide an electro-mechanical security lock for use in high security areas including prisons, military bases and other areas in which access must be regulated and wherein the latching mechanism associated with the lock may be alternately installed within the lock housing for use on right or left hand doors of both the sliding and swinging type.

It is also an object of the present invention to provide an electro-mechanical security lock having a single replaceable latch block assembly which includes a mounting block, a tongue engaging latch the micro switches and a retention element all of which are easily replaced as a single unit and which unit may also be installed in different orientations in the lock housing depending upon the type of door or gate which is to be secured.

It is a further object of the present invention to provide a lock for security areas wherein the lock is encased within an enclosed housing with the exception of a latching element which is movable with respect to a slot in the lock housing so that the working components of the lock are isolated from environmental conditions.

It is yet a further object of the present invention to provide a security lock having associated therewith a mechanical cylinder lock having a core which may be replaced so that, in the event of a security breach because of a missing key, the mechanical lock may be easily and readily changed.

It is another object of the present invention to provide an electro-mechanical lock for security doors and gates which includes a mechanical cylinder lock which may be lightweight in structure and operable by conventionally sized keys whereby the core element of the cylinder lock may be coordinated to match with interior access door keys associated with the facility which is to be protected so that guards or other personnel may utilize a single key both for interior and exterior accesses.

It is yet a further object of the present invention to provide an electro-mechanical lock for security doors and gates wherein a tongue associated with a door or gate acts as a tripping mechanism for controlling operation of the electro-mechanical lock and wherein the latching assembly is retained in position under the influence of a retainer which moves under the influence of gravity and spring force to retain the latch in a secured position until released either electrically or mechanically.

DESCRIPTION OF THE PREFERRED EMBODIMENT

Figure 1:
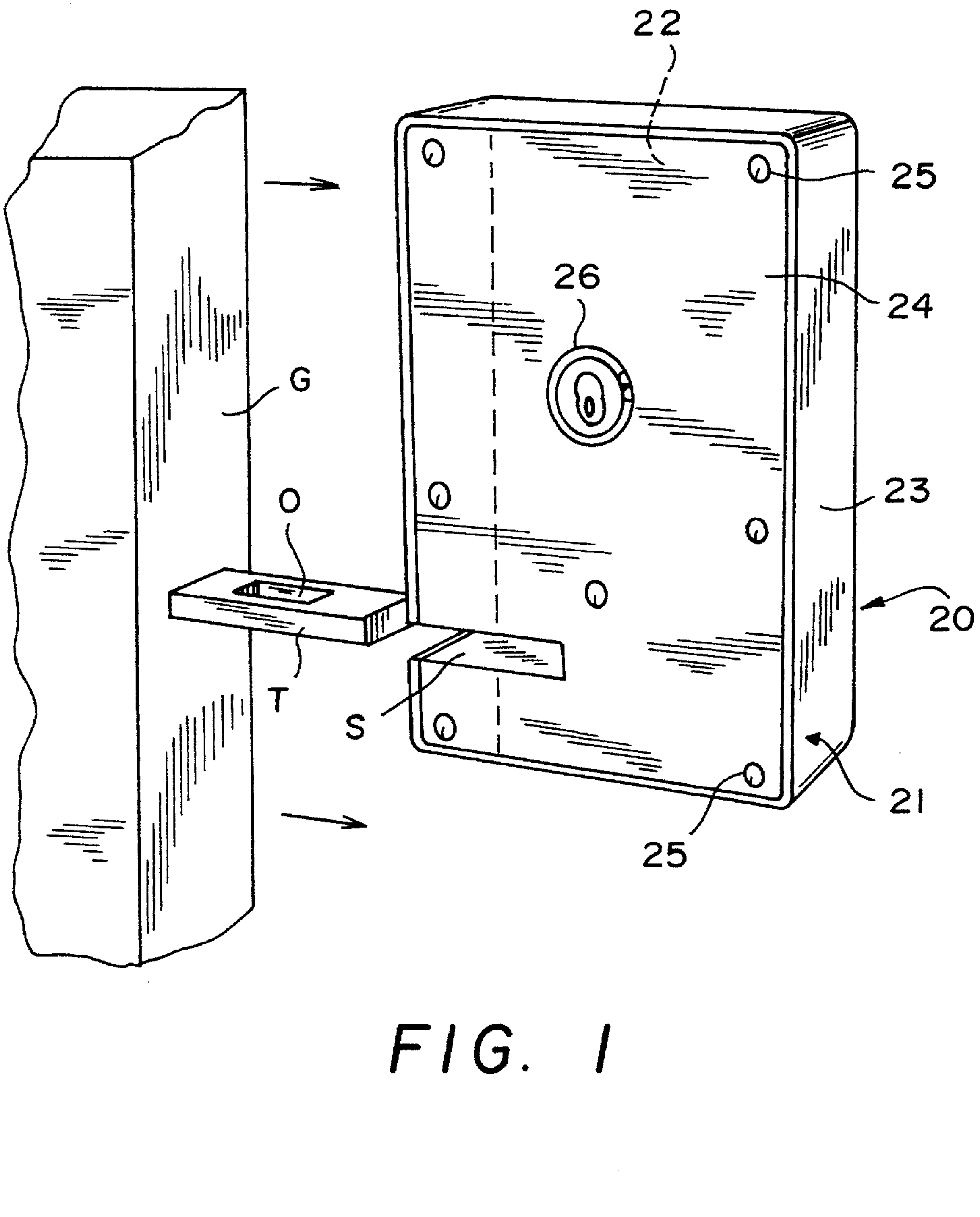
FIG. 1 is an illustrational view of the security lock of the present invention having portions broken away showing the relative movement of a slidable gate or door having a tongue insertable in the locking slot of the lock.
Figure 2:
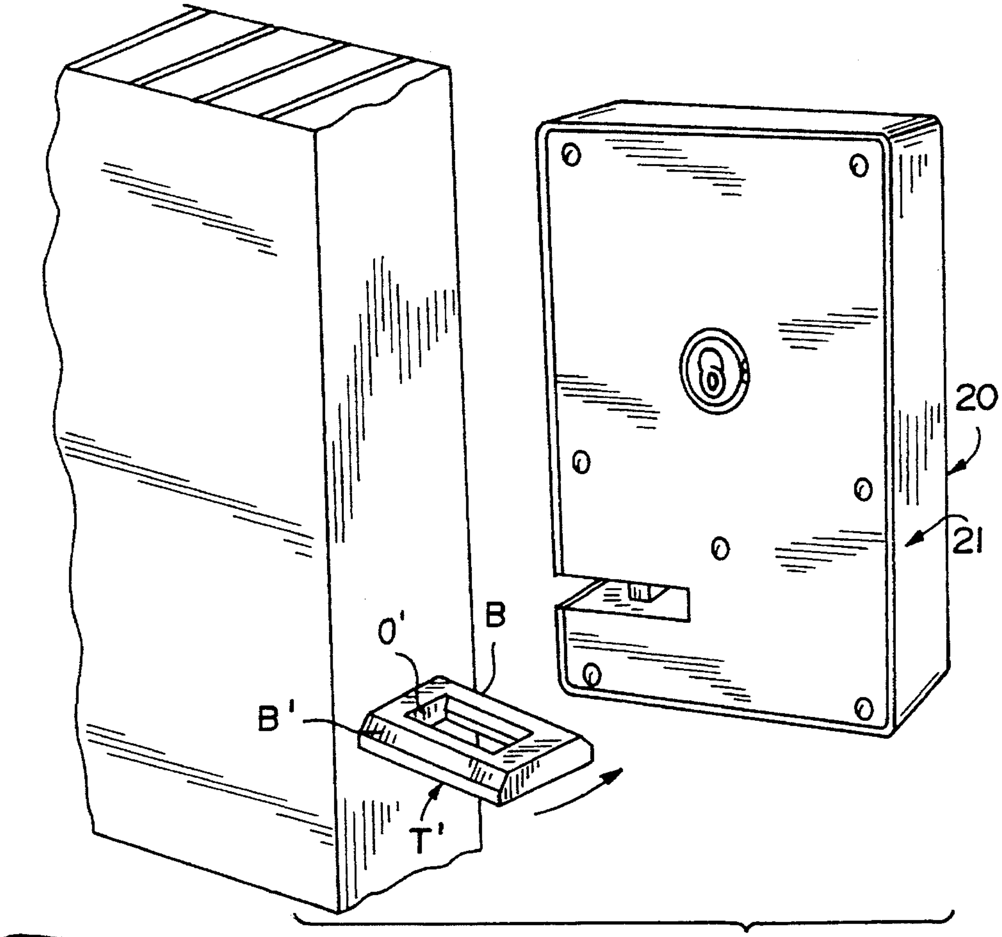
FIG. 2 is an illustrational view of the security lock of the present invention shown relative to a door mounted to swing about a left side pivot axis.
Figure 3:
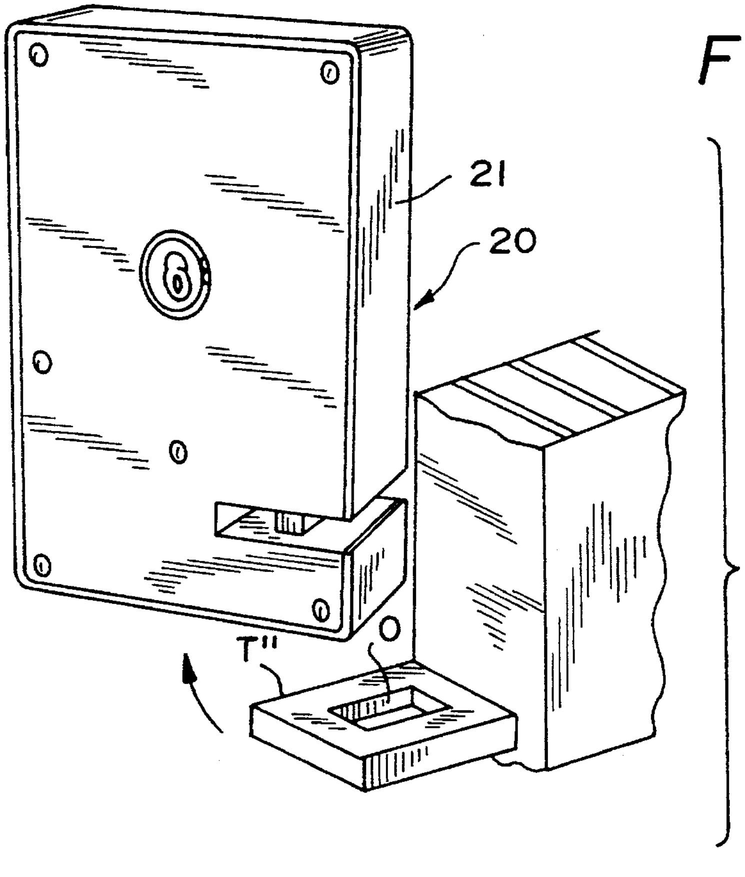
FIG. 3 is an illustrational view showing the security lock of the present invention oriented to receive the locking tongue of a door or gate mounted about a right side pivot axis.

The security lock 20 of the present invention is shown in FIG. 1 as being aligned for receiving the tongue "T" associated with a sliding gate or door "G". As shown, the door is approaching a slot "S" in the housing 21. The tongue "T" includes an opening "O" therethrough which is designed to receive a latch associated with a lock block assembly as will be described in greater detail hereinafter. Although the drawing figure shows the gate or door being slidable from left to right, the security lock of the present invention is equally capable of being reversely oriented for receiving a tongue of a sliding door approaching the security lock from the opposite side thereof. Further, as shown in FIGS. 2 and 3, the security lock of the present invention is also designed to be used with swinging doors or gates. As shown in FIG. 2, the security lock is oriented for receiving a swinging door pivoted about a vertical axis to the left of the door as shown in the drawings. The door includes a tongue "T'" which may have beveled front and rear edges as shown at "B" and "B'". Further, the opening "O'" therein may also constitute beveled edges, as shown. In FIG. 3, the lock of the present invention is oriented to receive the tongue "T"" of a door pivotable about an axis located to the right of the door or gate as shown therein. In this embodiment, the tongue "T"" is shown as having an opening "O" as disclosed with respect to the door or gate "G" shown in FIG. 1.

The housing 21 of the security lock includes a cover having an outer wall 22 and generally continuous sidewalls and upper and lower walls 23 which are integrally formed with respect to one another. The housing cover is closed by a plate 24 which is secured thereto by the use of screws or other fasteners 25. It is preferred that a continuous seal be provided between the plate and the cover to prevent the entrance of moisture and debris therebetween. The illustrated slot "S" is provided by cutting out portions of the plate 24 and the cover. When the security lock is used with a sliding gate as illustrated in FIG. 1, the plate may optionally not be provided with a cut-out portion so as to limit access to the interior of the housing. A key lock mechanism 26 is mounted to and extends within the housing. The function of the key lock will be described in greater detail hereinafter.

Figure 4:
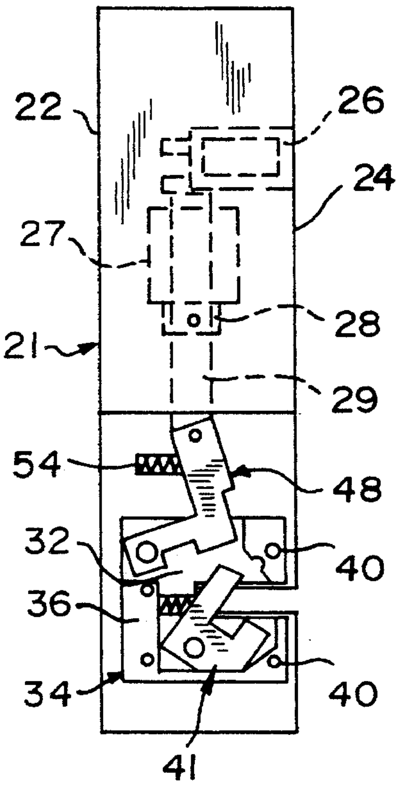
FIG. 4 is a partial cross-sectional view showing the latch block assembly of the present invention mounted for use for receiving the tongue of a swinging door or gate as shown in FIG. 2.
Figure 6:
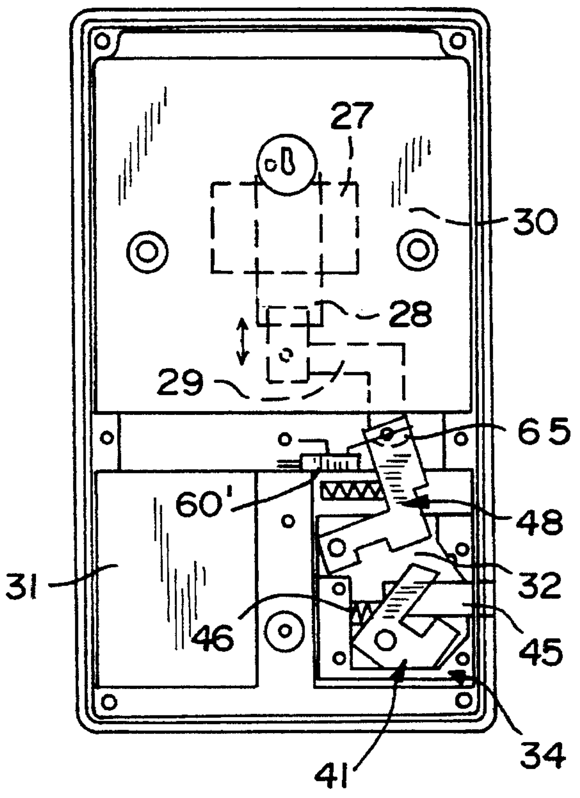
FIG. 6 is a cross-sectional view taken between the front and rear walls of the lock housing of the present invention showing the latch block assembly oriented for securing a sliding door movable toward the left with respect thereto as shown in FIG. 1.
Figure 7:
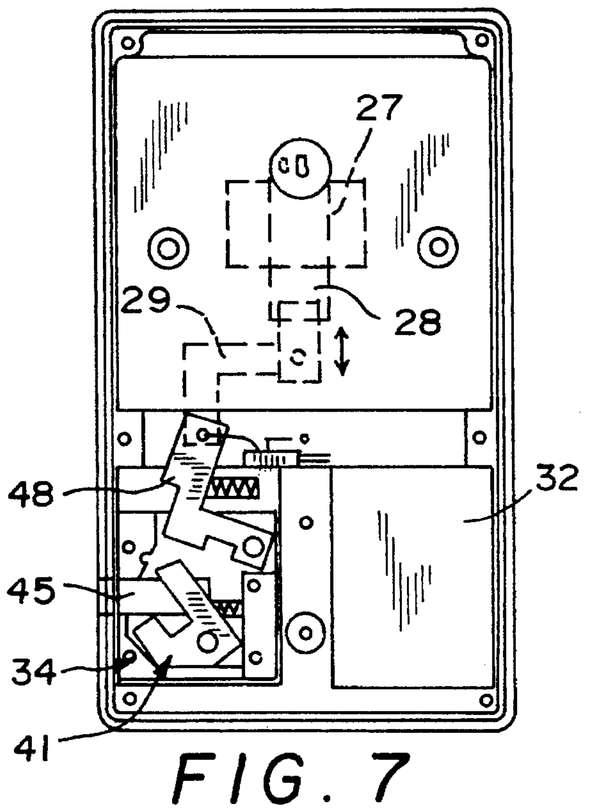
FIG. 7 is a cross-sectional view taken between the front and rear walls of the lock housing of the present invention showing the latch block assembly oriented for receiving a sliding door movable toward the right with respect thereto.

Referring to FIG. 4, the security lock of the present invention is an electro-mechanical lock and includes an inner solenoid assembly 27 which is electrically connected to a source of power (not shown). The solenoid assembly includes a shiftable core element 28 which is connected to an operating rod 29 which is further connected by a pivot pin to a member of a latch block assembly as will also be discussed in greater detail. As shown in FIGS. 6 and 7, the operating rod 29 may be formed as a right angle having two separate arms thereby allowing the rod to be positioned either to the left or the right with respect to the shiftable core 28. Thus, the rod may be oriented to either side of the core depending upon the orientation of the latch block mechanism.

Figure 5:
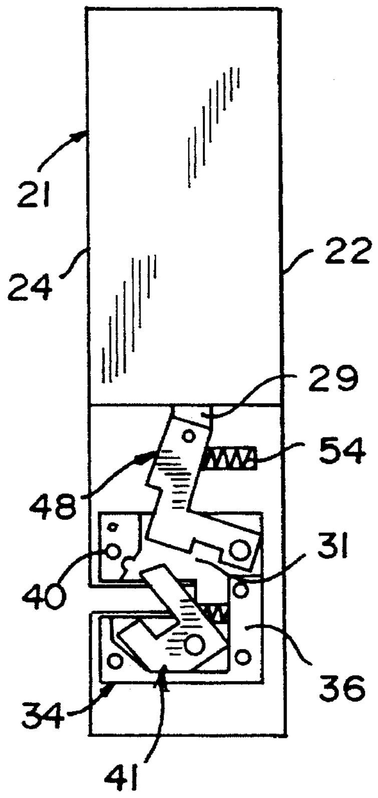
FIG. 5 is a cross-sectional view showing the latch block assembly of the present invention mounted for receiving the tongue of a swingable gate or door as shown in FIG. 3.
Figure 9:
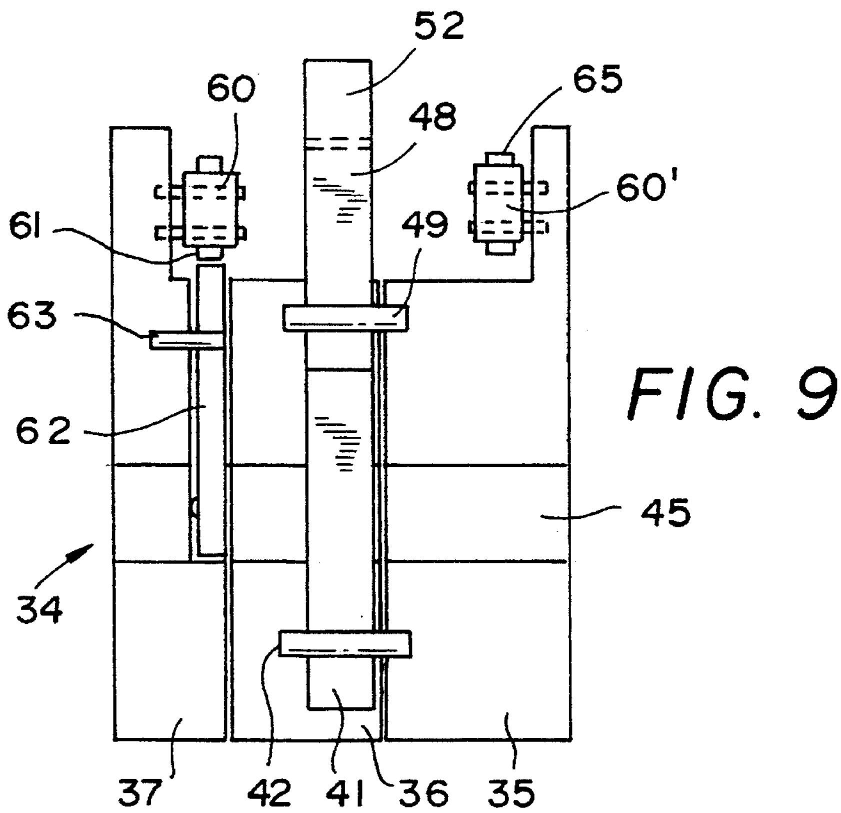
FIG. 9 is an enlarged front plan view of the latch block assembly of the present invention.
Figure 10:
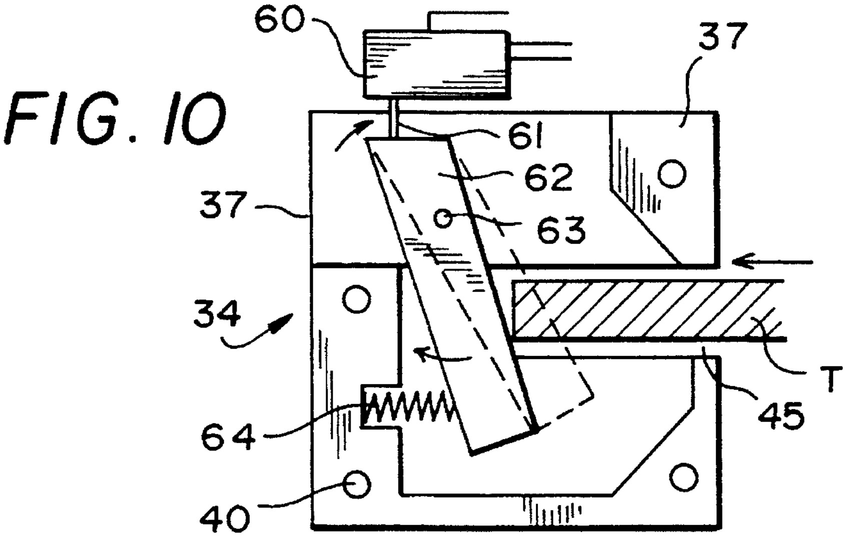
FIG. 10 is an enlarged partial cross-sectional view taken along lines 10—10 of FIG. 9 showing a micro switch arrangement for indicating the presence of the tongue of a door or gate entered within the slotted opening of the latch block assembly of the present invention.
Figure 11:
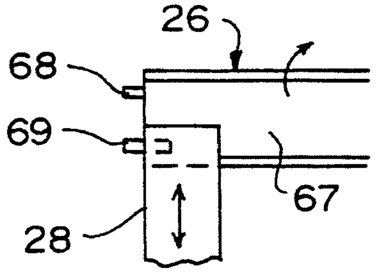
FIG. 11 is an enlarged illustrational view showing a rotating cylinder lock core having a pin for engaging a pin carried by the lifting rod associated with the solenoid control mechanism of the present invention.

As previously discussed, one of the unique features of the present invention is that the latching assembly associated therewith is designed to be installable in four (4) separate positions within the housing. With continued reference to FIGS. 4–7, the housing includes an inner upper cavity 30 in which the electrical control components and mechanical cylinder lock associated with the present invention are mounted. The housing also defines two lower cavities 31 and 32 which are designed to receive a latch block assembly 34. The block assembly 34 is preferably constructed of three (3) metallic plates 35, 36, and 37 which are assembled in generally parallel and spaced relationship with respect to one another as shown in FIG. 9. The plates are assembled utilizing a plurality of conventional fasteners such as screws 40. The latch block assembly 34 is preferably square and of a size to be mounted either perpendicularly with respect to the front 22 of the housing cover and plate 24 or mounted parallel therebetween depending upon whether the security lock is to be used with sliding or swinging gates or doors. When the security lock is to be used with sliding doors, the lock block assembly is mounted parallel with respect to the plate 24 as is shown in FIGS. 6 and 7, however, when the security lock is to be used with swinging gates, the latch block assembly 34 is mounted perpendicularly with respect to the plate 24, as shown in FIGS. 4 and 5.

Figure 8A:
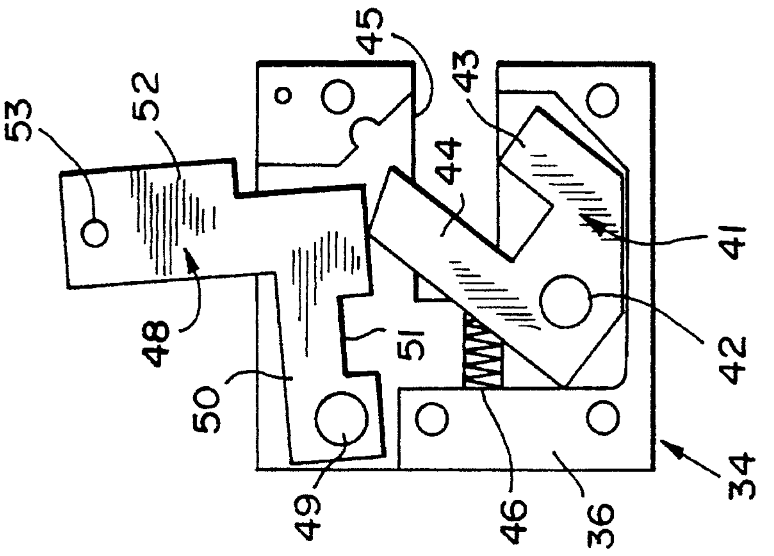
FIGS. 8A, 8B and 8C are enlarged cross-sectional views showing the latch block assembly of the present invention, FIG. 8A showing the latch in open position, FIG. 8B showing the latch in a retained position and FIG. 8C showing the retention element activated by a solenoid or key controlled lock cylinder to free the latch to an open position.
Figure 8B:
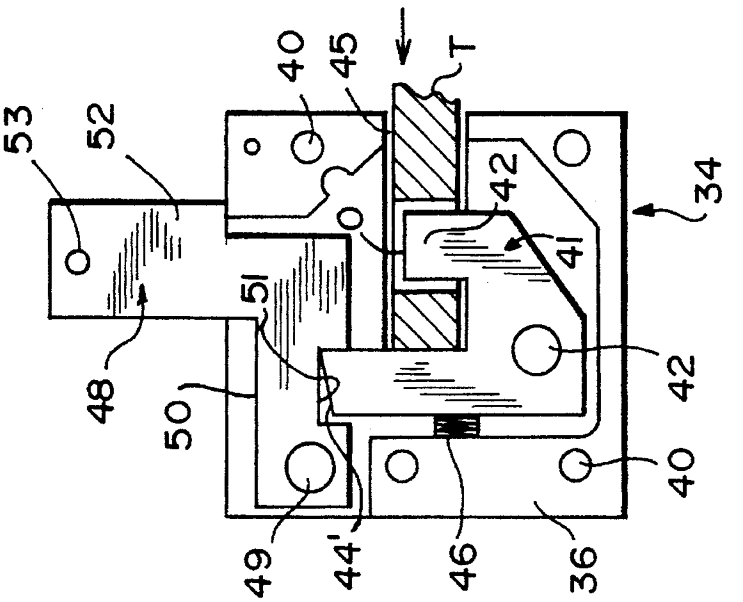
Figure 8C:
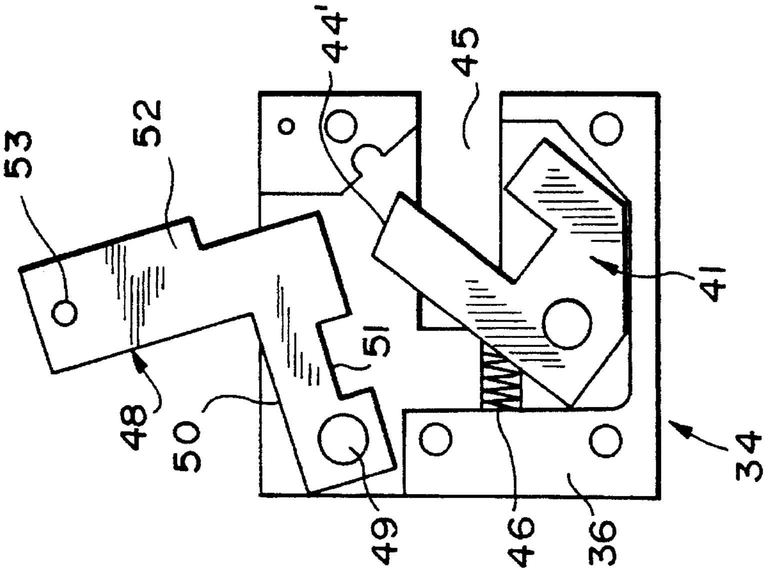

With particular reference to FIGS. 8A–8C, latching of the security lock with respect to the tongue "T" of a door or gate is accomplished by the use of a pivotable "J" latch 41 which is mounted between the plates 35 and 36 of the block assembly by a pivot pin 42. The "J" latch includes a locking tongue 43 and an elongated arm element 44 which is resiliently urged into a slotted opening 45 defined within the latch block assembly by a spring element 46 so that the arm 44 is normally within the slotted opening 45. The slotted opening 45 is of a size to cooperatively receive the tongue "T" associated with a door or gate. In view of the spring element 46, the locking tongue 43 is normally disposed below the slot 45 to allow clearance for the tongue of the door or gate. As shown in FIG. 8A, the lock is in its fully open position. As the tongue enters into the slotted opening 45 of the latch block assembly, the tongue engages the element 44 of the "J" latch thereby pivoting the latch 41 so as to rotate the locking tongue 43 into the opening "O" of the tongue "T".

In order to retain the "J" latch in a locked position, as shown in FIG. 8B a retention element 48 is pivotably mounted about pin 49 which extends between plates 35 and 36 of the latch block assembly. The retention element 48 includes a first generally horizontal arm element 50 having a slot 51 in the lower edge thereof of a size to receive the upper end 44' of the arm element of the "J" latch. The retention element 48 further includes a generally vertically extending portion 52 which is pivotably connected at 53 to the operating rod 29 associated with the solenoid and mechanical locks 27 and 26, respectively. The retention element is urged into the securing position shown in FIG. 8B under the influence of a spring 54 which is mounted within the housing and which acts to pivot the retention element about the pivot element 49. When the retention element is in the position of FIG. 8B, the upper end 44' of the "J" latch is positively engaged thereby preventing the withdrawal of the tongue 43 from the tongue "T".

To allow opening of the gate or door, the security lock of the present invention is provided with the solenoid 27. Activation of the solenoid will shift the core element 28 and lift operating rod 29 thereby raising the retention element 52 to the position shown in FIG. 8C and freeing the "J" latch to rotate about its pivot pin 42 upon movement of the tongue "T". The retention element 52 is retained in its raised position by the arm element 44 of the "J" latch, as is shown in FIG. 8A so that continuous operation of the electromagnet control element is not necessary. Because of the pivotable movement of the "J" latch 41, it is impossible for the latch tongue to be oriented into a position within the slotted passageway 45 when the locking mechanism is opened, as shown in FIG. 8A. The retention element engaging the upper portion of the "J" latch further assures that the tongue 43 remains in its lower pivoted position free of the slotted opening 45. Therefore, there can be no accidental damage to the locking tongue 43 by the insertion of the tongue element "T" as is the case with prior art "shot" pin locking devices.

As shown in drawing FIGS. 4–7, the orientation of the latch block assembly 34 is changed with respect to the cavities 31 and 32 in order to align the lock block assembly for use with either sliding or left and right hand pivoting doors. In this manner, the same latch assembly may be utilized with a plurality of different types of doors regardless of whether or not they are to be opened from the right or left. It is only necessary, to modify the housing to include the slot "S" therein which will align with the slotted opening 45 of the latch block assembly. This unique latching feature also allows the replacement of latches associated with a plurality of different types of swinging and sliding doors utilizing the same standard component. This facilities repair and reduces cost and time with respect to maintenance of the security locks.

To ensure that the security lock 20 of the present invention is properly secured to the tongue "T" of a door or gate, the lock is provided with a pair of micro switches 60 and 60' which are activated upon the insertion of the tongue "T" and the movement of the retention member 48 into a secured locked position as shown in FIG. 8B. With further reference to FIGS. 6, 7, 9 and 10, the first micro switch 60 includes an actuation arm 61 which is engageable by a lever 62 which is pivotably mounted between the plates 36 and 37 of the latch block assembly 34 by a pivot pin 63. The lever 62 is normally pivoted into the slotted opening 45 associated with the latch block assembly by a spring 64. As the tongue of a door or gate enters into the slotted opening 45, the lever 62 is engaged and moved from a dotted line position shown in FIG. 10 to the full line position wherein contact is made with the element 61 of the micro switch 60. This sends a signal to a remote location, such as a guard station, indicating that the tongue is in place within the latch block assembly. As a fail safe, the second micro switch 60' is mounted within the housing and includes a contact arm 65 which is normally engaged by the pivot pin which connects the retention element 48 to the actuation rod 29, as is shown in FIG. 6. When the actuation element 48 drops to the position shown in FIG. 8B in order to retain the "J" latch in a locked position, the actuation arm 65 is moved thereby creating a contact and sending a signal indicating that the retention element is in a securely locked position preventing the withdrawal of the tongue "T" associated with a door or gate.

In the event of an electrical failure, the solenoid system may be overridden by a rotating cylinder lock 26 having a central core 67 which is interchangeable so that in the event a key is lost, the core may be easily removed and a new core inserted. The core 67 is provided with an outer pin 68 which, when the core is rotated by the key, will engage another pin 69 extending from the shiftable core 28 of the electromagnet 27 and thereby raise the core and simultaneously the rod 29 connected to the retention element 48. Locking or closing of the latching element of the present invention is accomplished without the need for an electrical energy source as the pivoting arrangement between the "J" latch and the retention element is mechanically controlled.

We claim:

1. A security lock for use in engaging a tongue having an opening therein extending from either a pivotable or a sliding door or gate, wherein the security lock comprises, a housing having a cover and closure plate, a slot in said cover and closure plate of a size to receive the tongue, a latch block assembly mounted within said housing, said latch block assembly having a slotted opening therein, said slotted opening being aligned with said slot in said cover and closure plate of said housing, said latch block assembly including a pivotable latch having a locking tongue and a spaced arm element, said locking tongue being moveable between a first position wherein said locking tongue is positioned within said slotted opening to a second position wherein said locking tongue is pivoted from said slotted opening, a retention element pivotably mounted within said latch block assembly, said retention element being movable from a first position, in spaced relationship from said arm element of said pivotable latch, to an intermediate position wherein said retention element engages said arm element of said pivotable latch and a third position wherein said retention element engages said arm element to retain said pivotable latch is said first position thereof, means for moving said retention element from said third position to said first position to release said pivotable latch to allow said locking tongue to move to said second position, said latch block assembly including at least three plates being assembled in spaced relationship with respect to one another so as to define two channels, said pivotable latch and said retention element being mounted within one of said channels, and a pair of latch block receiving cavities within said housing, said latch block assembly being selectively mountable within either of said cavities.

2. The security lock of claim 1 including first resilient means for urging said pivotable latch to said second position thereof.

3. The security lock of claim 2 including resilient means for urging said retention element toward said intermediate and said second position thereof.

4. The security lock of claim 3 in which said retention element includes a first generally horizontal portion mounted to a pivot pin, and a vertical portion extending therefrom, an opening formed in said horizontal portion of a size to cooperatively receive said arm element of said pivotable latch.

5. The security lock of claim 4 including a first micro switch mounted within said housing, and means for activating said micro switch in response to the tongue being inserted within said slotted opening of said latch block assembly.

6. The security lock of claim 5 including a second micro switch mounted within said housing and being activated in response to said retention element being moved to said third position thereof.

7. The security lock of claim 1 in which said latch block assembly is adapted to be mounted within said housing so that said pivotable latch and said retention element are selectively oriented generally parallel or perpendicular with said plate of said housing.

8. The security lock of claim 1 in which said pivotable latch and said retention element are oriented generally perpendicularly with respect to said plate of said housing.

9. The security lock of claim 7 including a pivotable lever mounted within the other of said channels, said lever being movable by engagement by said tongue being inserted within said slotted opening from a first position to a second position, a micro switch being engageable by said pivotable lever when said lever is in said second position to thereby indicate the presence of the tongue within said slotted opening.

10. A security lock for use in engaging a tongue having an opening therein extending from either a pivotal or a sliding closure, wherein the security lock comprises, a housing having a cover and a closure plate, a slot in said cover and said closure plate of a size to receive the tongue, a latch block assembly mounted within said housing, said latch block assembly having a slotted opening therein, said slotted opening being aligned with said slot in said cover and closure plate of said housing, said latch block including a pivotal latch having a locking tongue and a spaced arm element, said locking tongue being movable between a first position wherein said locking tongue is positioned within said slotted opening to a second position wherein said locking tongue is pivoted from said slotted opening, a retention element pivotally mounted within said latch block assembly to retain said pivotal latch in said first position, said latch block assembly being adapted to be selectively mounted parallel to said closure plate so that said pivotal latch and said retention element are oriented in a first orientation within said housing and perpendicular to said plate so that said pivotal latch and said retention element are oriented in a second orientation within said housing whereby said security lock is adapted for use with both pivotable and sliding closures.

11. The security lock of claim 10 including a pair of latch block receiving cavities within said housing, said latch block assembly being adapted to being selectively mounted either parallel or perpendicular to said closure plate within either of said cavities.

12. The security lock of claim 11 in which said latch block assembly includes at least three plates being assembled in spaced relationship with respect to one another so as to define two channels, said pivotable latch and said retention element being mounted within one of said channels.

13. The security lock of 12 including a pivotable lever mounted within the other of said channels, said pivotable lever being adapted to be movable by engagement by a tongue being inserted within said slotted opening from a first position to a second position, a micro switch being engageable by said pivotable lever when said pivotable lever is in said second position to thereby indicate the presence of the tongue within said slotted opening.

14. The security lock of claim 10 in which said retention element includes a first generally horizontal portion mounted to a pivot pin, and a vertical portion extending therefrom, an opening formed in said horizontal portion of a size to cooperatively receive said arm element of said pivotable latch.

15. The security lock of claim 10 in which said retention element being movable from a first position in spaced relationship from said arm element of said pivotable latch, to an intermediate position wherein said retention element engages said arm element of said pivotable latch and a third position wherein said retention element engages said arm element to retain said pivotable latch in said first position thereof, a first micro switch mounted within said housing, and means for activating said micro switch in response to the tongue being inserted within said slotted opening of said latch block assembly.

16. The security lock of claim 15 including a second micro switch mounted within said housing and being activated in response to said retention element being moved to said third position thereof.

17. The security lock of claim 16 including first resilient means for urging said pivotable latch to said second position thereof.

18. The security lock of claim 17 including resilient means for urging said retention element toward said intermediate and said second position thereof.

* * * * *